US011874407B2

(12) United States Patent
Syed et al.

(10) Patent No.: US 11,874,407 B2
(45) Date of Patent: Jan. 16, 2024

(54) TECHNOLOGIES FOR DYNAMIC, REAL-TIME, FOUR-DIMENSIONAL VOLUMETRIC MULTI-OBJECT UNDERWATER SCENE SEGMENTATION

(71) Applicant: CODA OCTOPUS GROUP, INC., Orlando, FL (US)

(72) Inventors: Alam Abbas Syed, Orlando, FL (US); Blair G. Cunningham, Orlando, FL (US)

(73) Assignee: CODA OCTOPUS GROUP INC., Orlando, FL (US)

(*) Notice: Subject to any disclaimer, the term of this patent is extended or adjusted under 35 U.S.C. 154(b) by 589 days.

(21) Appl. No.: 16/795,201

(22) Filed: Feb. 19, 2020

(65) Prior Publication Data
US 2021/0256704 A1 Aug. 19, 2021

(51) Int. Cl.
G01S 7/539 (2006.01)
G06T 7/12 (2017.01)
G01S 15/89 (2006.01)
G06V 20/00 (2022.01)
G06V 20/64 (2022.01)
G06F 18/24 (2023.01)

(52) U.S. Cl.
CPC ............ G01S 7/539 (2013.01); G01S 15/89 (2013.01); G06F 18/24 (2023.01); G06T 7/12 (2017.01); G06V 20/00 (2022.01); G06V 20/64 (2022.01); G06T 2207/10028 (2013.01)

(58) Field of Classification Search
CPC ............ G06T 7/12; G06T 2207/10028; G06K 9/6267; G01S 7/539; G01S 15/89; G06V 20/00; G06V 20/64
See application file for complete search history.

(56) References Cited

U.S. PATENT DOCUMENTS

| 8,144,546 B2* | 3/2012 | Lovik | G01S 7/539 367/139 |
| 10,338,195 B2* | 7/2019 | Stokes | G01S 7/003 |
| 2007/0159922 A1* | 7/2007 | Zimmerman | G01S 15/86 367/103 |

(Continued)

OTHER PUBLICATIONS

Turgay Celik, A Novel Method for Sidescan Sonar Image Segmentation, IEEE Journal of Oceanic Engineering, vol. 36, No. 2, Apr. 2011 (Year: 2011).*

(Continued)

Primary Examiner — Ian J Lobo
Assistant Examiner — Christopher Richard Walker
(74) Attorney, Agent, or Firm — Barnes & Thornburg LLP

(57) ABSTRACT

Technologies for processing a three-dimensional (3D) underwater scene is disclosed. A computing device receives a data set representative of an underwater environment corresponding to sonar data generated by a sonar transducer assembly and receiving parameters. The data set includes 3D volumetric points representative of at least one 3D volumetric data set at one or more time points. The computing device applies segmentation modes on the data set, in which each segmentation mode generates a processed subset of the 3D volumetric points. Each processed subset includes one or more 3D volumetric objects. The computing device classifies one or more 3D volumetric objects based on a combination of the plurality of processed subsets.

20 Claims, 6 Drawing Sheets

(56) References Cited

U.S. PATENT DOCUMENTS

| | | | | |
|---|---|---|---|---|
| 2009/0016161 A1* | 1/2009 | Gendron | ................. | G01S 7/539 |
| | | | | 367/88 |
| 2012/0099402 A1* | 4/2012 | Debrunner | ............. | G06V 20/64 |
| | | | | 367/134 |
| 2014/0254324 A1* | 9/2014 | Dubberley | ............. | G06V 10/60 |
| | | | | 367/88 |
| 2014/0266860 A1* | 9/2014 | Blumrosen | ............. | G01S 15/89 |
| | | | | 367/87 |
| 2019/0033447 A1* | 1/2019 | Chan | ...................... | G06V 10/82 |

OTHER PUBLICATIONS

Pascal Galerne, "Object Classification Using Neural Networks in Sonar Imagery", Proc. SPIE 3101, New Image Processing Techniques and Applications: Algorithms, Methods, and Components II (Year: 1997).*

Cobb et al., "Multiple-instance learning-based sonar image classification," Proc. of SPIE vol. 10182, Detection and Sensing of Mines, Explosive Objects, and Obscured Targets XXII, 101820H, edited by Steven S. Bishop, Jason C. Isaacs (May 3, 2017).

* cited by examiner

TECHNOLOGIES FOR DYNAMIC, REAL-TIME, FOUR-DIMENSIONAL VOLUMETRIC MULTI-OBJECT UNDERWATER SCENE SEGMENTATION

TECHNICAL FIELD

Embodiments presented herein generally relate to sonar imaging, and more specifically, to performing segmentation on real-time four-dimensional volumetric (4D) data obtained underwater such that moving objects are clearly identifiable.

BACKGROUND

Image segmentation has applications in a variety of fields. For instance, underwater image processing uses segmentation techniques on a real-time four-dimensional volumetric (4D) underwater scene obtained by acoustic volumetric sonar imaging to separate the scene into analyzable components, such as separating dynamically moving foreground objects from static background objects including multiple separation to retain, for example, one object in a cluttered underwater scene or any number of objects/underwater targets in the scene. These segmented objects may then be used in contexts such as localization, tracking, classification, feature extraction, scene modeling, objection recognition, noise removal, and so on. However, segmentation, particularly in the field of underwater image processing, presents many challenges. Underwater environmental conditions, such as sediment and water column clutter, marine life, and acoustic interference and artefacts, may further complicate segmentation or produce suboptimal results. In addition, large amounts of data often needs to be processed for segmentation to perform tasks reliably (e.g., mapping and other decision-making techniques that require quality conditioning of the data), and as such, doing so in real-time may be challenging. Because segmented data may potentially be used in further contexts, obtaining meaningful data from image segmentation is highly desirable.

The use of co-segmentation techniques on high resolution sonar images produced by high-frequency synthetic aperture sonar (SAS) for seabed texture segmentation is known (COBB et al. Multiple-instance learning-based sonar image classification. In: Proceedings Detection of Mines, Explosive Objects and Obscured Targets XXII, Vol 10182, SPIE). However, the co-segmentation technique described is supervised classification system performed on two-dimensional (2D) sonar data sets. It requires significant user interaction during training and is not suitable for 3D and/or noisy collection data samples, specifically four-dimensional volumetric data samples in which objects are present sporadically in a set of images over time.

SUMMARY

One embodiment presented herein discloses a method for processing a three-dimensional (3D) underwater scene. The method generally includes receiving, by a computing device, a data set representative of an underwater environment corresponding to sonar data generated by a sonar transducer assembly and receiving a plurality of parameters, the data set including a plurality of 3D volumetric points representative of at least one 3D volumetric data set at one or more time points. The method also includes applying, by the computing device, each of a plurality of segmentation modes on the data set, wherein each segmentation mode generates a processed subset of the plurality of 3D volumetric points, each processed subset including one or more 3D volumetric objects. The one or more 3D volumetric objects are classified based on a combination of the plurality of processed subsets.

Another embodiment presented herein discloses a computer-readable storage medium storing instructions, which, when executed by a computing device, performs an operation for processing a 3D underwater scene. The operation itself generally includes receiving, by a computing device, a data set representative of an underwater environment corresponding to sonar data generated by a sonar transducer assembly and receiving a plurality of parameters, the data set including a plurality of 3D volumetric points representative of at least one 3D volumetric data set at one or more time points. The operation also includes applying, by the computing device, each of a plurality of segmentation modes on the data set, wherein each segmentation mode generates a processed subset of the plurality of 3D volumetric points, each processed subset including one or more 3D volumetric objects. The one or more 3D volumetric objects are classified based on a combination of the plurality of processed subsets.

Yet another embodiment presented herein discloses a computing device having one or more processors and a memory storing program code, which, when executed on the one or more processors, performs an operation for processing a 3D underwater scene. The operation itself generally includes receiving, by a computing device, a data set representative of an underwater environment corresponding to sonar data generated by a sonar transducer assembly and receiving a plurality of parameters, the data set including a plurality of 3D volumetric points representative of at least one 3D volumetric data set at one or more time points. The operation also includes applying, by the computing device, each of a plurality of segmentation modes on the data set, wherein each segmentation mode generates a processed subset of the plurality of 3D volumetric points, each processed subset including one or more 3D volumetric objects. The one or more 3D volumetric objects are classified based on a combination of the plurality of processed subsets.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1A:
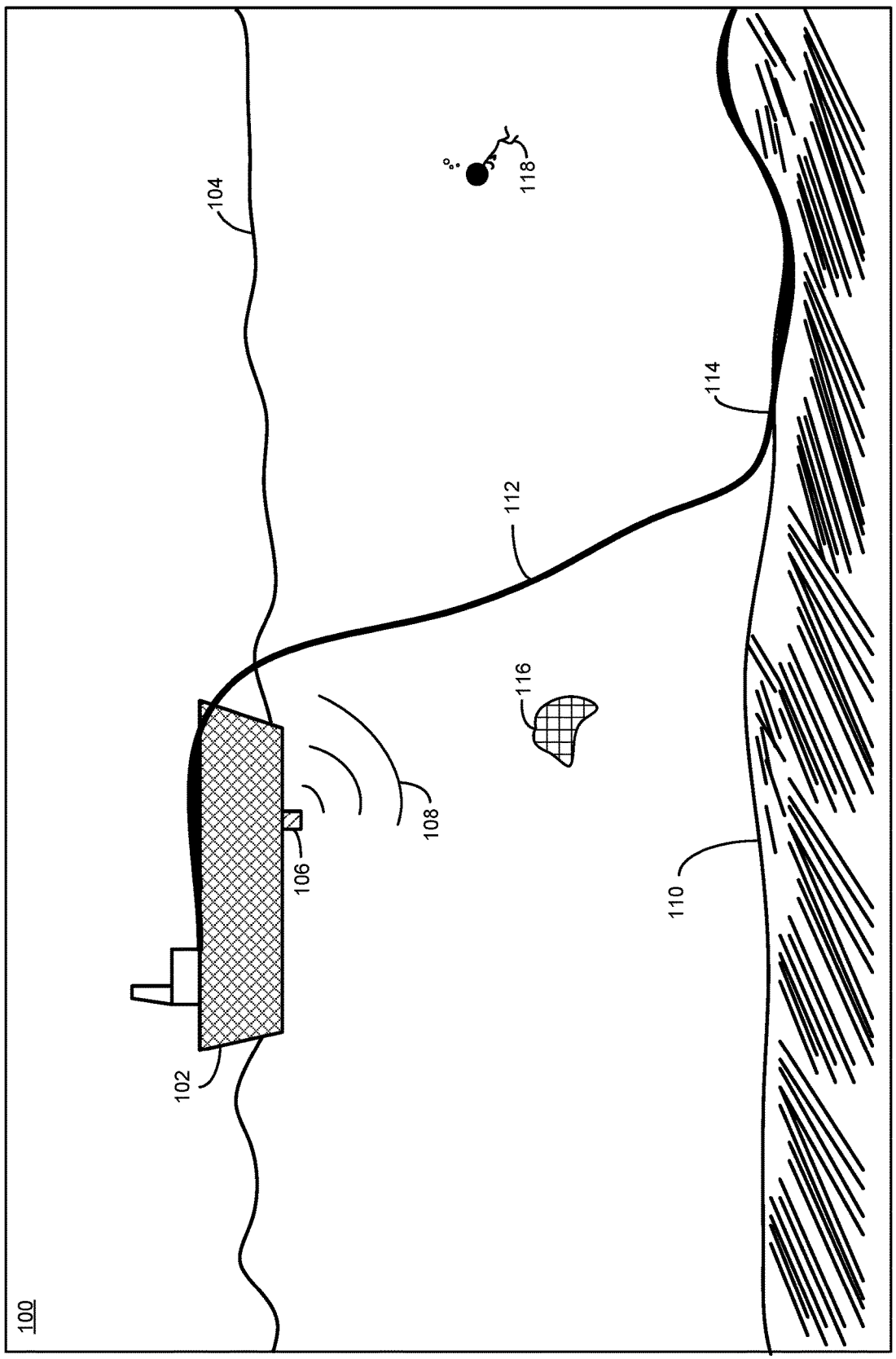
FIG. 1A is a simplified conceptual diagram of at least one embodiment of an example underwater environment in which a computing device may perform three-dimensional (3D) volumetric segmentation.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Embodiments presented herein disclose a system and techniques for processing a three-dimensional (3D) volumetric underwater scene. More particularly, the disclosed techniques provide an approach that includes executing a combination of segmentation operations on an input set of 3D volumetric data (e.g., represented using 3D points, voxels, etc.) representative of the scene for a given time period (e.g., in relative real-time, obtained at ping rates in excess of five pings per second), such that moving objects are clearly identifiable. These operations (also referred to herein as "segmentation modes") may include various shape-based segmentation techniques, such as planar models, line and curve models, known priori models, cylindrical models, primitives models, and so on). In addition, as further described herein, the segmentation modes may be executed recursively over spatial and temporal dimensions in the 3D volumetric data set. Doing so yields multiple interpretations of a given underwater scene across the time period. Multiple interpretations may include, by way of example, a segmentation of the underwater scene into core foreground and background subsets, classification of identified objects to known shapes, measurements of identified objects, and so on. Such an approach may provide semantic meaning to otherwise nondescript arbitrary clusters representing a real-world scene.

In some embodiments, the computing device could be embodied as a sonar device having a sonar signal generator that produces and emits sonar signals underwater. The sonar device may also include a transducer for receiving the reflected signal. Once received, the sonar device may interpret the reflected signal data as 3D volumetric data comprising multiple 3D volumetric points. Given a set of 3D volumetric data representative of an underwater scene, the embodiments of the techniques described herein may jointly identify, among other things, the ground surface and segment individual objects of the scene, such as ground surface and underlying or overhanging structures. At least some embodiments may advantageously generate meaningful data usable as input to further processing, such as in object detection, tracking, and noise removal applications. In the underwater imaging context, segmentation data may be used in a variety of applications, including but not limited to, reliably tracking a diver in real-time, identifying a cable touch down point on a seabed, pile identification, and so on.

By example, object tracking, such as a cable in the underwater scene is critical for many high-precision applications including renewable cable lay between monopiles of an offshore wind farm. The cable is typically a very small target (e.g., between 0.5-1 inch), and given the typical ranges that the sonar may observe the cable, the target is often <3% of the image resolution. Using the methods outlined, the seabed may be segmented as a background object, and the last known cable target points may be used to segment the cable catenary from the remaining foreground image and the remaining points fall into noise. Doing so results in three distinct datasets: the background seabed, the foreground cable catenary, and the remaining noise or artefact data. The cable catenary may be used to predict the touch down of the cable on the seabed by finding the optimum intersection point as being the touch down point.

Referring now to FIG. 1A, an example underwater environment 100 in which 3D multi-ping volumetric data may be obtained and analyzed is shown. Illustratively, FIG. 1A depicts a sea vessel 102 atop an ocean 104. FIG. 1A further depicts a variety of objects under the ocean 104 to portray examples of objects that may be segmented according to embodiments disclosed herein. In this example, the sea vessel 102 is depicted as laying a cable 112 on a seabed 110 of the ocean 104. Other objects in the ocean 104 include debris 116 and a diver 118.

The sea vessel 102 may be embodied as any water vehicle capable of traveling a body of water, such as the ocean 104. As shown, the sea vessel 102 is coupled with a computing device 106. Although the computing device 106 is depicted herein as an attachment to the bottom of the sea vessel 102, the computing device 106 may be adapted to a variety of settings, such as being attached to a cable or wire from the sea vessel 102, embodied within a robot, embodied within a remotely operated vehicle, and the like. Further, the computing device 106 may include communication circuitry to send data collected (e.g., 3D volumetric data) and analyzed (e.g., segmentation data) to a remote device, such as a management console located within the sea vessel 102.

In an embodiment, the computing device 106 includes a sound navigation and ranging (SONAR) transducer assembly, which may include a signal generator and transducer. Such components allow the computing device 106 to generate a sonar pulse. FIG. 1A depicts the sonar pulse as a wave front 108 propagating from the computing device 106. The pulses of the wave front 108 are generally short (e.g., within a range of ten to 100 microseconds) and spread relatively broadly over an angular range. Using known sonar-based techniques, the computing device 106 may derive raw imaging data indicative of an underwater scene from signals reflected by objects in the sea and received by the transducer of the computing device 106. In an embodiment, the raw imaging data is derived as 3D volumetric points collected at a specified ping rate. For instance, in practice, the specified ping rate may be at least five pings per second. Further, the computing device 106 may assign timestamps to the raw imaging data as the signal is collected and analyzed.

From the raw 3D volumetric data derived by the sonar equipment in the computing device 106, it is desirable to identify data points that are associated with a given object and, via segmentation techniques, separate those data points from points associated with background (e.g., the seabed 110). Doing so allows the computing device 106 (or other computing device receiving the data) to classify such objects and perform further analysis for a given task. However, the 3D volumetric data may generally be affected by various factors, such as underwater conditions, clutter, noise, marine life, acoustic interference, and the like. Such factors may complicate segmentation of relevant objects in the underwater scene, whether the scene is a dynamic scene (e.g., the scene includes multi-ping 3D volumetric data) or a static scene (e.g., the scene includes 3D volumetric data at a given point in time).

As further described herein, the computing device 106 may include a segmentation framework that may be applied to the 3D volumetric data over real-time. The framework includes various modes corresponding to segmentation operations for identifying objects in the scene. Each mode may rely on a priori knowledge of a scene (if available) or execute automatically (e.g., by techniques such as Euclidean clustering in which a proximity to a cluster classifies a point to be an inlier or outlier point for a given shape). The framework allows for improved alignments of successive scans by enabling segmentation operations in frozen—time-space—pings.

For a given task (e.g., cable catenary tracking, feature completion based on robust fit for estimation of a cable touch down point, structured object counting, known shape model fitting, amorphous object tracking, and the like), the framework may deploy a combination of segmentation modes suitable to the task through process that may include modes processed serially (e.g., output is derived as a function of previous output and new data (if available)), processed in parallel (e.g., output is simultaneously derived from a given input), and processed iteratively (e.g., a given data set is used to refine an estimate repeatedly through a specified limit). For instance, planar segmentation is a mode that uses random sample consensus (RANSAC) and is suitable to independently be applied for a variety of tasks because a planar segmentation mode assuming the underwater scene having the seabed in plane form clearly distinguishes ground segments from non-ground segments. Further, the framework provides a segmentation mode for robust extraction of geometric primitives including planar, curve, cylinder, line, and the like, as segmentation objects from acoustic imaging data (e.g., the 3D volumetric data). Further still, the framework provides for identification of novel objects via a priori segmentation. In addition, the framework assists users in marking objects and regions of interest to localize and refine for robust detection and tracking. The framework allows the combination of segmentation modes to be computed in parallel to obtain multiple interpretations for a given scene and thereby assist with performing effective classification as well as increased perceptual ability within a 3D scene environment.

Figure 1B:
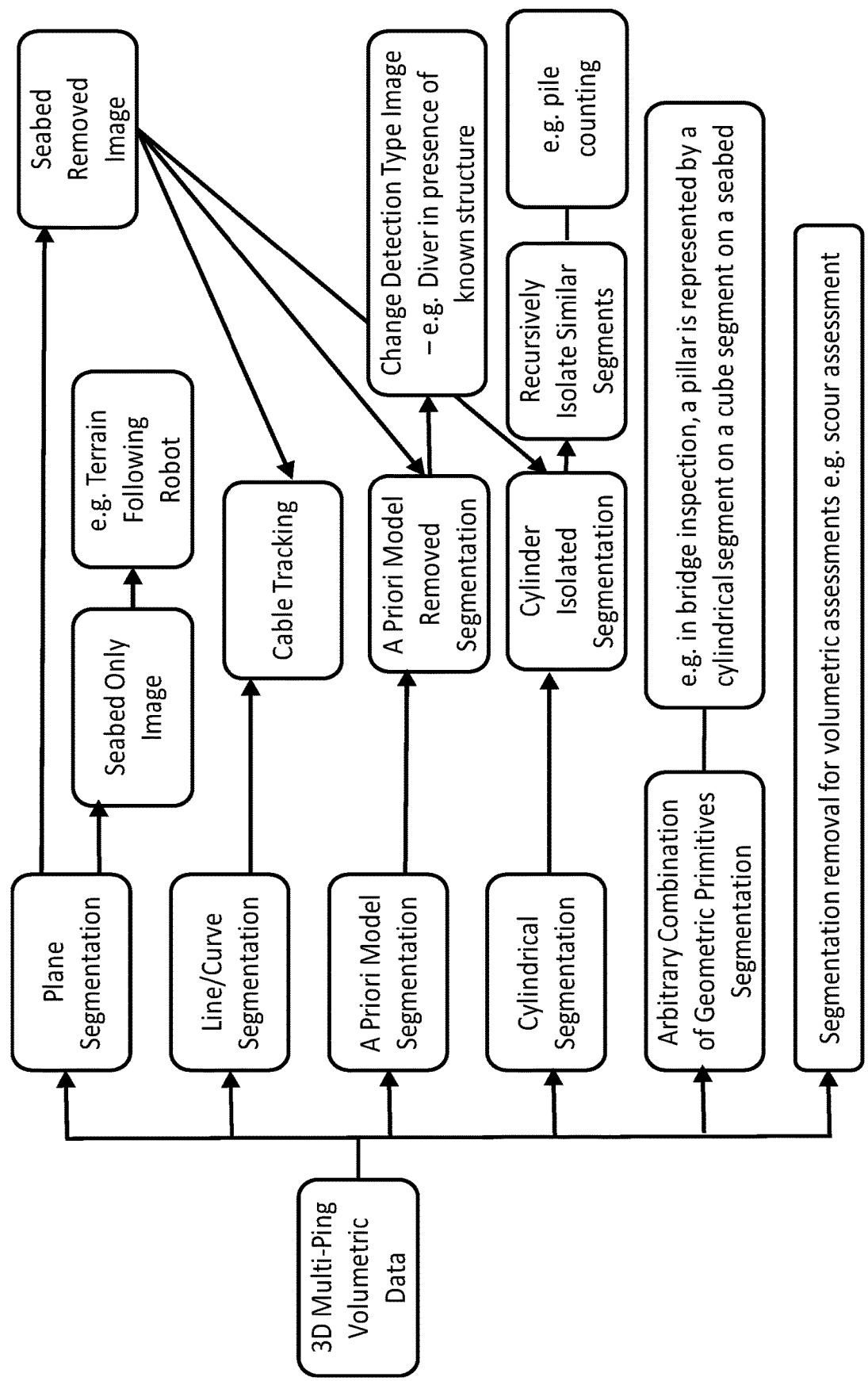
FIG. 1B is a conceptual diagram of a segmentation framework illustrating an example of how combinations of segmentation modes may be deployed.

FIG. 1B is a schematic of a segmentation framework, illustrating how combinations of segmentation modes may be deployed for a given number of tasks performed on a given 3D multi-ping volumetric data set. The modes may be performed iteratively or recursively. The modes may be performed serially or in parallel.

A planar segmentation mode may deployed to distinguish and isolate a seabed plane. The seabed plane may be visualized on its own, for example for use in navigation for a terrain-following robot, or the seabed plane may be removed to assist in further tasks, for example cable tracking, threat detection, for example from identify a diver in the presence of a secure structure, or pile counting.

Cable tracking may be performed using a segmentation mode, for example a line and/or curve segmentation mode, in serial or parallel with the segmentation mode used for seabed removal. The 3D volumetric object representing the cable may be tracked globally based on combining information from both intra-ping threshold information within a 3D volumetric data set collected during a single ping and inter-ping threshold information within a 3D multi-ping volumetric data set collected over two or more pings.

A priori models may be used in combination with other segmentation modes in tasks such as change detection, for example for the identification and tracking of a diver that may be posing a threat by moving near a known secure structure.

Pile counting is another potential application using a pile segmentation mode. Consider a combination of cylindrical or line segmentation mode with a seabed segmentation. Within a given view, 3D point clusters that resemble a cylindrical object such as a pile can be identified based on user defined criteria such as width of the pile. Once identified, each 3D volumetric object associated with a pile may be isolated one at a time. Within a single view, there may be more than one pile present, hence the process may be applied recursively to identify all the 3D volumetric objects associated with piles. As the sonar device moves, new piles not seen may appear within its field of view. The new piles may be counted recursively, eliminating all those that have been encountered in the previous ping (based on spatial proximity criteria) and accounting only for the new one. Once a full scene pass is completed, a final count may be obtained, representing all the physical objects of pile present from the multi-ping 3D volumetric data.

Often in real world are not sufficiently represented by perfect geometric for the purpose of segmentation. For instance, in the case of pillar of a bridge which is useful for application such as bridge inspection, a combination of primitives model information combined with RANSAC may be used to robustly locate and segment a 3D volumetric object representing the object in the real world. A pillar resembles a cube-like structure at the bottom and a cylindrical object on top. A combination of these two primitives may be used as a representation during segmentation.

Figure 2:
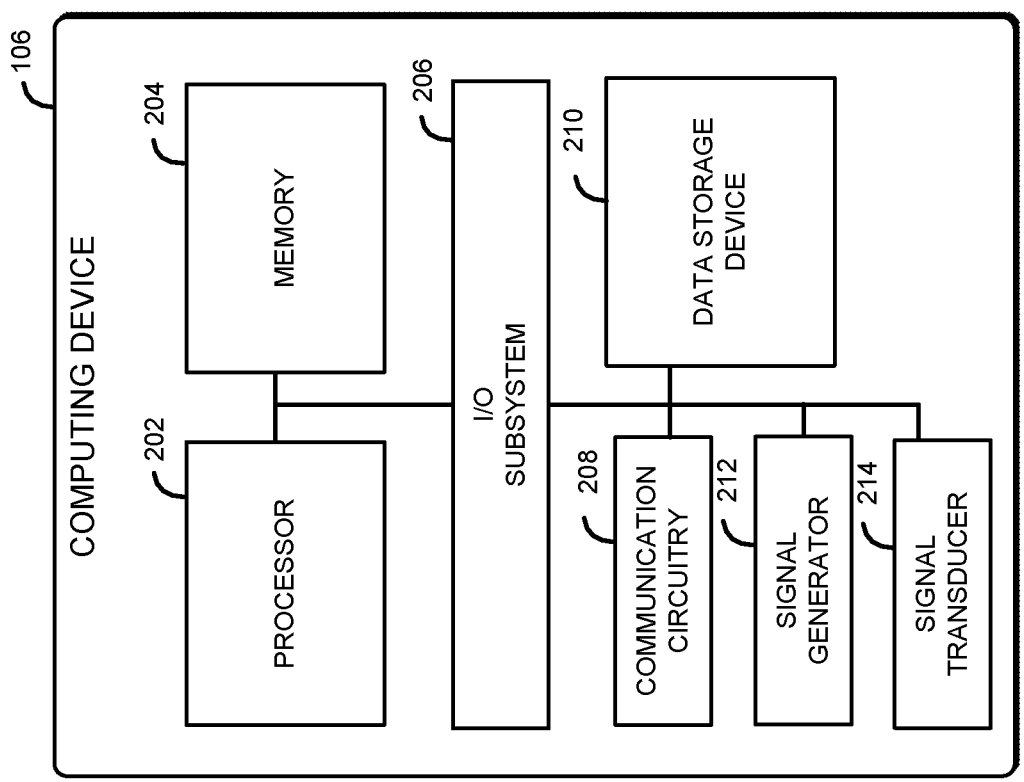
FIG. 2 is a simplified block diagram of at least one embodiment of the computing device described relative to FIG. 1.

Referring now to FIG. 2, the computing device 106 may be embodied as any type of device capable of performing the functions described herein, such as receiving a data set representative of a 3D underwater scene and parameters, applying a combination of segmentation modes on the data set in which each mode generates a processed subset of the data set, and classifying objects within each processed subset.

As shown, the illustrative computing device 106 includes a processor 202, a memory 204, an input/output (I/O) subsystem 206, communication circuitry 208, a data storage device 210, a signal generator 212, and a signal transducer 214. Of course, in other embodiments, the computing device 106 may include other or additional components, such as those commonly found in a computer (e.g., display, peripheral devices, etc.). Additionally, in some embodiments, one or more of the illustrative components may be incorporated in, or otherwise form a portion of, another component.

The processor 202 may be embodied as one or more processors, each processor being a type capable of performing the functions described herein. For example, the processor 202 may be embodied as a single or multi-core processor(s), a microcontroller, or other processor or processing/controlling circuit. In some embodiments, the processor 202 may be embodied as, include, or be coupled to a field programmable gate array (FPGA), an application-specific integrated circuit (ASIC), reconfigurable hardware or hardware circuitry, or other specialized hardware to facilitate performance of the functions described herein.

The memory 204 may be embodied as any type of volatile (e.g., dynamic random access memory, etc.) or non-volatile memory (e.g., byte addressable memory) or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). In some embodiments, all or a portion of the memory 204 may be integrated into the processor 202.

The processor 202 and the memory 204 are communicatively coupled with other components of the computing device 106 via the I/O subsystem 206, which may be embodied as circuitry and/or components to facilitate input/output operations with the processor 202 and/or the memory 204 and other components of the computing device 106. For example, the I/O subsystem 206 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 206 may form a portion of a system-on-a-chip (SoC) and be incorporated, along with one or more of the processor 202, the memory 204, and other components of the computing device 106.

The communication circuitry 208 may be embodied as any communication circuit, device, or collection thereof, capable of enabling communications over a network between the computing device 106 and other devices (e.g., a management console on the sea vessel 102). The communication circuitry 208 may be configured to use any one or more communication technology (e.g., wired, wireless, and/or cellular communications) and associated protocols (e.g., Ethernet, Bluetooth®, Wi-Fi®, WiMAX, 5G-based protocols, etc.) to effect such communication. For example, to do so, the communication circuitry 208 may include a network interface controller (NIC, not shown), embodied as one or more add-in-boards, daughtercards, controller chips, chipsets, or other devices that may be used by the computing device 106 for network communications with remote devices. For example, the NIC may be embodied as an expansion card coupled to the I/O subsystem 206 over an expansion bus such as PCI Express.

The illustrative data storage device 210 may be embodied as any type of devices configured for short-term or long-term storage of data such as, for example, memory devices and circuits, memory cards, hard disk drives (HDDs), solid-state drives (SSDs), or other data storage devices. The data storage device 210 may include a system partition that stores data and firmware code for the data storage device 210. The data storage device 210 may also include an operating system partition that stores data files and executables for an operating system.

The signal generator 212 may be embodied as any type of device or circuitry capable of generating sonar pulse signals and transmitting the sonar pulse signals in a physical space. The signal transducer 214 may be embodied as any type of device or circuitry capable of receiving signals reflected by objects in response to contact with the generated sonar pulse signals. Although depicted as separate components, the signal generator 212 and signal transducer 214 may be incorporated into a sonar equipment device housed within the computing device 106.

Figure 3:
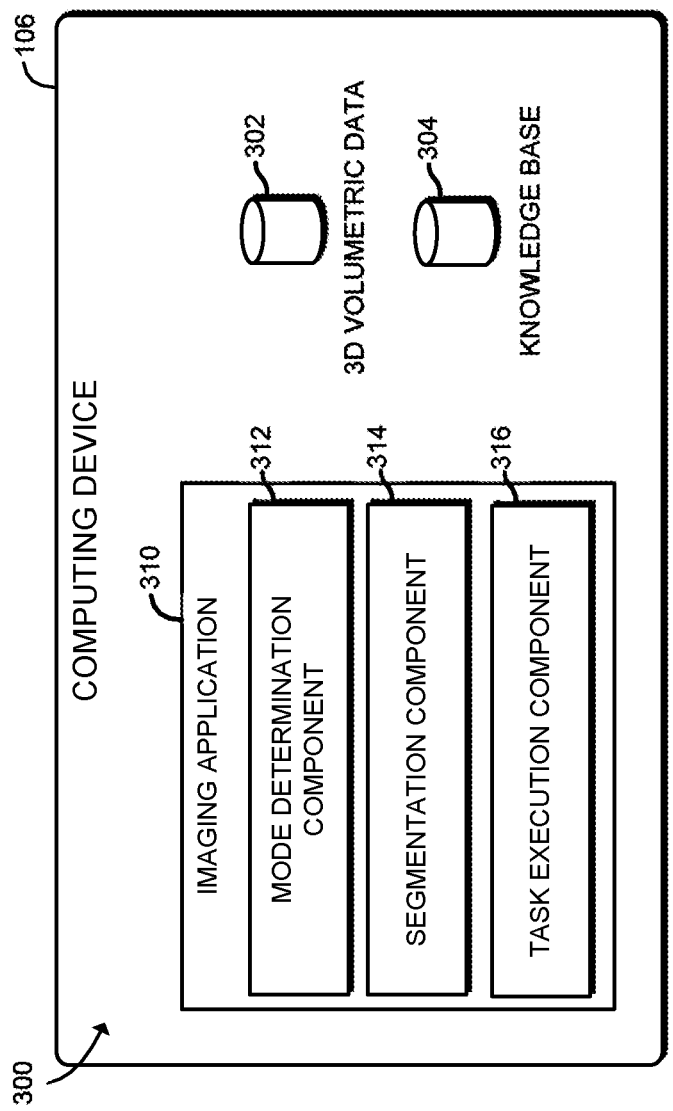
FIG. 3 is a simplified block diagram of at least one embodiment of an environment that may be established by the computing device described relative to FIG. 2.

Referring now to FIG. 3, the computing device 106 may establish an environment 300 during operation. The illustrative embodiment includes an imaging application 310. The imaging application 310 may be embodied as hardware, firmware, software, or a combination thereof. Further, in some embodiments, one or more of the components of the environment 300 may be embodied as circuitry or a collection of electrical devices. It should be appreciated that, in some embodiments, imaging application 310 may form a portion of one or more of the communication circuitry 208, the I/O subsystem 206, signal generator 212, signal transducer 214, and/or other components of the computing device 106. Additionally, in some embodiments, one or more of the illustrative components may form a portion of another component and/or one or more of the illustrative components may be independent of one another. In the illustrative embodiment, the environment 300 also includes 3D volumetric data 302, which may be embodied as any spatial and temporal data points corresponding to an underwater scene captured over a time period and a physical location. The environment 300 also includes a knowledge base 304, which may be embodied as any data of known shape descriptors, a priori models, and the like for use in image segmentation of the 3D volumetric data 302. The 3D volumetric data 302 and the knowledge base 304 may be maintained in a storage, such as the data storage device 210.

As shown, the imaging application 310 may include a mode determination component 312, a segmentation component 314, and a task execution component 316. In the illustrative embodiment, the mode determination component 312, which may be embodied as hardware, firmware, software, virtualized hardware, emulated architecture, and/or a combination thereof as discussed above, is configured to evaluate a specified task to perform on the 3D volumetric data 302. As described, a task is indicative of a desired goal that relies on classifications of underlying objects in the 3D volumetric data 302. Tasks may include cable catenary tracking, diver (and other amorphous object) tracking, cable touch down point determination, structured object counting, known shape model fitting, autonomous underwater vehicle (AUV) or remotely operated underwater vehicle (ROV) tracking, terrain and scene modeling, path planning, localization, feature extraction, data alignment, change detection (e.g., methods that use statistically significant differences in data sets that represent the same physical 3D volume at different points in time), threat detection, and the like.

Based on the evaluation, the mode determination component 312 may identify a combination and sequence of segmentation modes to perform. Segmentation modes may include planar segmentation, line and curve segmentation, priori model segmentation, cylindrical segmentation, primitives segmentation, and change detection. In an embodiment, each segmentation mode follows a random sample consensus (RANSAC) procedure on the 3D volumetric data 302 to produce a subset of 3D data points corresponding to a relatively precise segmentation class. Further, each segmentation mode is extensible through a known shape descriptor (e.g., of the knowledge base 304). The known shape descriptor may be indicative of a mathematical shape, such as a plane, a cylinder, or other equation-based model. In other cases, the known shape descriptor may be indicative of a physical 3D volumetric data set from an a priori model scan. In some embodiments, this may advantageously allow segmentation modes to extrapolate an object from limited and/or noisy data based on a mathematical fit. The mode determination component 312 may further determine, based on the specified task and required parameters for that task, an output flow from segmentation mode to segmentation mode (e.g., to determine which outputs of a given segmentation mode should be used as input to another segmentation mode).

The illustrative segmentation component 314, which may be embodied as hardware, firmware, software, virtualized hardware, emulated architecture, and/or a combination thereof as discussed above, is configured to execute the determined combination of segmentation modes on the 3D volumetric data 302. In an embodiment, the execution of segmentation modes occurs iteratively and recursively through spatial and time dimensions. Doing so separates and classifies the scene into meaningful components for further processing. For instance, the segmentation component 314 may output resulting subsets generated by each segmentation mode for the task execution component 316, serving a preprocessing step for the 3D volumetric data 302 prior to the task being executed. The task execution component 316, which may be embodied as hardware, firmware, software, virtualized hardware, emulated architecture, and/or a combination thereof as discussed above, is configured to provide, as input, resulting subsets for the specified task. The task execution component 316 may carry out the specified known task using the resulting subsets to obtain a more accurate and effective outcome.

As an example, assume that for a given scene, a planar segmentation mode may be deployed to distinguish and isolate a seabed plane. The segmentation component 314 may isolate such points per ping. Within a single frozen-in-time ping, the segmentation component 314 may iteratively fit a ground plane model and select plane coefficients based on RANSAC, which is a robust statistical procedure. The segmentation component 314 may also select plane coefficients based on intensity. Once the inliers are identified that belongs to the plane in space, those points are then removed for further processing by the task execution component 316, such as for a line fitting for cable-laying application. Further, the task execution component 316 statistically fits a line model similarly, which results in an output of a line location and orientation along with a plane location and orientation. Across time, the imaging application 310 tracks these quantities by computing in a per-ping or snapshot basis, then previous values are carried over to locate and calculate those objects in the next pings where temporal filtering can be used. Hence, the imaging application 310 may compute quantities iteratively, serially, or in parallel across space and time dimensions to achieve a desired goal and use that information, e.g., to assist an underlying ship to steer in the right trajectory to stay on a pre-planned course of cable-laying.

Figure 4:
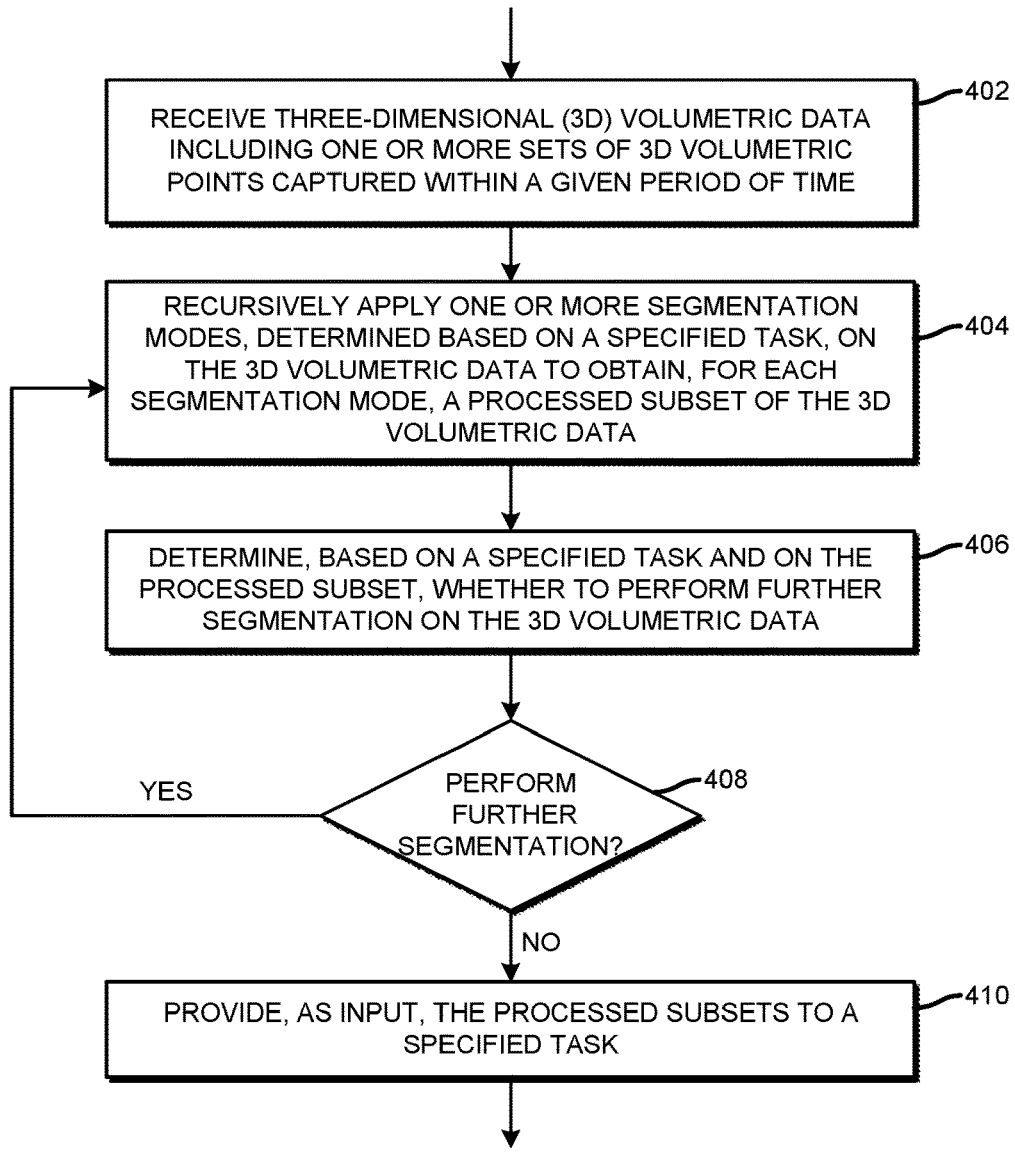
FIG. 4 is a simplified flow diagram of a method for performing 3D volumetric segmentation on a data set.

Referring now to FIG. 4, the computing device 106, in operation (e.g., via the imaging application 104), performs a method 400 for performing 3D volumetric segmentation on a data set (e.g., 3D volumetric data 302) for a specified task. For example, assume that the specified task corresponds to a computation for a touch down point 114 for the cable 112 of FIG. 1. The computing device 106 may determine, based on the task, a combination of segmentation modes to perform to obtain meaningful data to input for the task.

As shown, the method 400 begins in block 402, in which the computing device 106 receives 3D volumetric data 302. The 3D volumetric data 302 includes one or more sets of 3D volumetric points captured within a given time period and for a given space. In this example, the 3D volumetric data 302 corresponds to an underwater scene at a location in proximity to the cable 112.

The method 400 advances to block 404 in which the computing device 106 recursively applies one or more segmentation modes (e.g., determined based on the specified task) on the 3D volumetric data 302. Doing so allows the computing device 106 to obtain a processed subset of the 3D volumetric data. Continuing the example, the computing device 106 may execute a planar segmentation on the 3D volumetric data 302 iteratively and in parallel to obtain a data subset corresponding to an identification of the seabed 110 at a catenary intersection. The parallel execution may also yield a 3D image having the seabed 110 and removed.

The method 400 continues to block 406 in which the computing device 106 determines, based on the specified task and on the processed subsets, whether to perform further segmentation on the 3D volumetric data. For example, the computing device 106 may determine that a line and curve segmentation is to be performed using the 3D image having the seabed 110 removed as input to obtain cable catenary points. In block 408, the computing device 106 determines whether to carry out additional segmentation. If so, then the method 400 returns to block 404. Otherwise, the method 400 proceeds to block 410, in which the computing device 106 provides the processed subsets as input for the specified task. In this example, the computing device 106 may provide the cable catenary points and intersection data to the task being executed to determine the touch down point.

Figure 5:
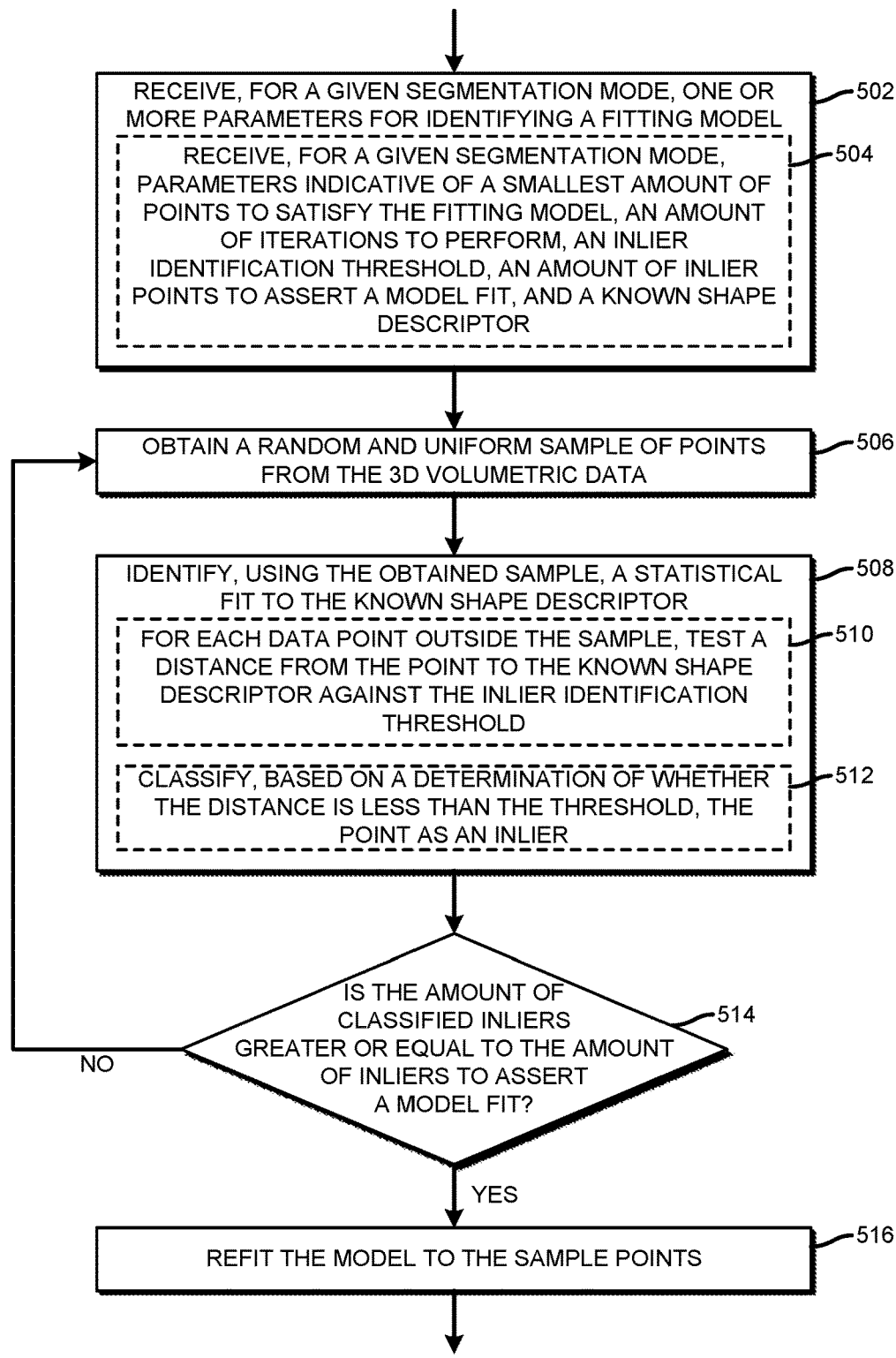
FIG. 5 is a simplified flow diagram of a method for performing 3D volumetric segmentation on a data set according to a given segmentation mode.

As stated, each segmentation mode may follow the RANSAC procedure when executed. Each segmentation mode may also use intensity as a criteria for selection or rejection of 3D volumetric points, in combination with or separate from the 3D geometrical position of the 3D volumetric points in the RANSAC procedure. The intensity of a given 3D volumetric point is a measure of the quality of the sonar reflections received due to multiple reflections from an object back to the receiver. Referring now to FIG. 5, the computing device 106, in operation, may perform a method 500 for performing segmentation on a data set according to a given segmentation mode using the RANSAC procedure. For instance, the method 500 may be carried out as part of block 404.

As shown, the method 500 begins in block 502, in which the computing device receives, for a given segmentation mode, one or more parameters for identifying a fitting model to that mode (e.g., a planar mode, line and curve model, a priori model, etc.). More particularly, in block 504, the computing device 106 may receive, for a given segmentation mode, one or more parameters including a smallest amount of points to satisfy the fitting model, an amount of iterations to perform, an inlier identification threshold, an amount of inlier points to assert a model fit, and a known shape descriptor for the mode.

Once the parameters are determined, in block 506, the computing device 106 obtains a random and uniform sample of points from the 3D volumetric data according to the smallest amount of points parameter. In block 508, the computing device 106 identifies, using the obtained sample, a statistical fit to the known shape descriptor. More particularly, in block 510, for each data point outside the sample, the computing device 106 tests a distance from the point to the known shape descriptor against the provided inlier identification threshold. The computing device 106 may then determine whether the distance is less than the threshold. In block 512, if the distance is less than the threshold, the computing device 106 classifies the point as an inlier. In block 514, the computing device 106 determines whether the amount of classified inliers is greater or equal to the amount of inliers to assert a model fit. If so, then in block 516, the computing device 106 refits the model to the sample points. Otherwise, the method 500 returns to block 506 and continues the process until the specified amount of iterations is reached.

EXAMPLES

Illustrative examples of the technologies disclosed herein are provided below. An embodiment of the technologies may include any one or more, and any combination of, the examples described below.

Example 1 includes a method for processing a three-dimensional (3D) underwater scene, the method comprising receiving, by a computing device, a data set representative of an underwater environment corresponding to sonar data generated by a sonar transducer assembly and receiving a plurality of parameters, the data set including a plurality of 3D volumetric points representative of at least one 3D volumetric data set at one or more time points; applying, by the computing device, each of a plurality of segmentation modes on the data set, wherein each segmentation mode generates a processed subset of the plurality of 3D volumetric points, each processed subset including one or more 3D volumetric objects; and classifying, by the computing device, the one or more 3D volumetric objects based on a combination of the plurality of processed subsets.

Example 2 includes the subject matter of Example 1, and wherein applying, by the computing device, the plurality of the segmentation modes further comprises applying at least one of the plurality of the segmentation modes recursively using the generated subset as input.

Example 3 includes the subject matter of any of Examples 1 and 2, and wherein the data set further includes one or more time points associated with each 3D volumetric point and wherein applying the plurality of the segmentation modes further comprises applying the plurality of the segmentation modes across the one or more time points.

Example 4 includes the subject matter of any of Examples 1-3, and wherein the data set is representative of sonar data generated at time points at a rate of at least five pings per second.

Example 5 includes the subject matter of any of Examples 1-4, and wherein the receiving of the data set, the application of the segmentation modes, and the classification are performed in real-time.

Example 6 includes the subject matter of any of Examples 1-5, and wherein at least two of the plurality of segmentation modes are performed in parallel.

Example 7 includes the subject matter of any of Examples 1-6, and wherein classifying, by the computing device, the one or more 3D volumetric objects further comprises matching each of the one or more 3D volumetric objects to one of a plurality of known objects.

Example 8 includes the subject matter of any of Examples 1-7, and further including correlating, by the computing device, a 3D volumetric object of a first generated subset with a 3D volumetric object of a second generated subset.

Example 9 includes the subject matter of any of Examples 1-8, and further including performing, by the computing device, one or more tasks using the classified one or more objects as input.

Example 10 includes the subject matter of any of Examples 1-9, and wherein one or more parameters are provided as input for at least one of the plurality of segmentation modes, the one or more parameters including at least one of a smallest number of points to satisfy a fitting model, a number of iterations to perform, an inlier identification threshold, a number of inlier points to assert a model fit, or a shape descriptor.

Example 11 includes the subject matter of any of Examples 1-10, and wherein processed output from a first segmentation mode to a second segmentation mode is determined based on the one or more tasks being performed.

Example 12 includes the subject matter of any of Examples 1-11, and wherein the one or more tasks comprises at least one of a seabed detection, terrain following, scene modeling, cable touch down point detection, autonomous underwater vehicle or remotely operated underwater vehicle tracking, structured object counting, path planning, localization, data alignment, threat detection, change detection, manual input processing, or diver tracking operation.

Example 13 includes the subject matter of any of Examples 1-12, and wherein the plurality of segmentation modes includes at least one of planar segmentation, line segmentation, curve segmentation, cylindrical segmentation, primitives segmentation, a priori model segmentation, or change detection.

Example 14 includes the subject matter of any of Examples 1-13, and wherein an inliers selection for the one or more 3D volumetric objects is based on a 3D geometrical position and/or an intensity of a 3D volumetric point.

Example 15 includes a non-transitory computer-readable storage medium comprising a plurality of instructions, which, when executed on one or more processors of a computing device, performs an operation for processing a three-dimensional (3D) underwater scene, the operation comprising receiving a data set representative of an underwater environment corresponding to sonar data generated by a sonar transducer assembly and receiving a plurality of parameters, the data set including a plurality of 3D volumetric points representative of at least one 3D volumetric data set at one or more time points; applying each of a plurality of segmentation modes on the data set, wherein each segmentation mode generates a processed subset of the plurality of 3D volumetric points, each processed subset including one or more 3D volumetric objects; and classifying the one or more 3D volumetric objects of each processed subset based on a combination of the plurality of processed subsets.

Example 16 includes the subject matter of Example 15, and wherein applying the plurality of the segmentation modes further comprises applying at least one of the plurality of the segmentation modes recursively using the generated subset as input.

Example 17 includes the subject matter of any of Examples 15 and 16, and wherein the data set further includes one or more time points associated with each 3D volumetric point and wherein applying the plurality of the segmentation modes further comprises applying the plurality of the segmentation modes across the one or more time points.

Example 18 includes the subject matter of any of Examples 15-17, and wherein the data set is representative of sonar data generated at time points at a rate of at least five pings per second.

Example 19 includes the subject matter of any of Examples 15-18, and wherein the receiving of the data set, the application of the segmentation modes, and the classification are performed in real-time.

Example 20 includes the subject matter of any of Examples 15-19, and wherein at least two of the plurality of segmentation modes are performed in parallel.

Example 21 includes the subject matter of any of Examples 15-20, and wherein classifying the one or more 3D volumetric objects further comprises matching each of the one or more 3D volumetric objects to one of a plurality of known objects.

Example 22 includes the subject matter of any of Examples 15-21, and wherein the operation further comprises correlating a 3D volumetric object of a first generated subset with a 3D volumetric object of a second generated subset.

Example 23 includes the subject matter of any of Examples 15-22, and wherein the operation further comprises performing one or more tasks using the classified one or more objects as input.

Example 24 includes the subject matter of any of Examples 15-23, and wherein one or more parameters are provided as input for at least one of the plurality of segmentation modes, the one or more parameters including at least one of a smallest number of points to satisfy a fitting model, a number of iterations to perform, an inlier identification threshold, a number of inlier points to assert a model fit, or a shape descriptor.

Example 25 includes the subject matter of any of Examples 15-24, and wherein processed output from a first segmentation mode to a second segmentation mode is determined based on the one or more tasks being performed.

Example 26 includes the subject matter of any of Examples 15-25, and wherein the one or more tasks comprises at least one of a seabed detection, terrain following, scene modeling, cable touch down point detection, autonomous underwater vehicle or remotely operated underwater vehicle tracking, structured object counting, path planning, localization, data alignment, threat detection, change detection, manual input processing, or diver tracking operation.

Example 27 includes the subject matter of any of Examples 15-26, and wherein the plurality of segmentation modes includes at least one of planar segmentation, line segmentation, curve segmentation, cylindrical segmentation, primitives segmentation, a priori model segmentation, or change detection.

Example 28 includes the subject matter of any of Examples 15-27, and wherein an inliers selection for the one or more 3D volumetric objects is based on a 3D geometrical position and/or an intensity of a 3D volumetric point.

Example 29 includes a computing device comprising a sonar transducer assembly; one or more processors; and a memory storing program code, which, when executed on the one or more processors, performs an operation for processing a three-dimensional (3D) underwater scene, the operation comprising receiving a data set representative of an underwater environment corresponding to sonar data generated by the sonar transducer assembly and receiving a plurality of parameters, the data set including a plurality of 3D volumetric points representative of at least one 3D volumetric data set at one or more time points; applying each of a plurality of segmentation modes on the data set, wherein each segmentation mode generates a processed subset of the plurality of 3D volumetric points, each processed subset including one or more 3D volumetric objects; and classifying the one or more 3D volumetric objects of each processed subset based on a combination of the plurality of processed subsets.

Example 30 includes the subject matter of Example 29, and wherein the sonar transducer assembly further comprises a signal generator and a signal transducer.

Example 31 includes the subject matter of any of Examples 29 and 30, and wherein applying the plurality of the segmentation modes further comprises applying at least one of the plurality of the segmentation modes recursively using the generated subset as input.

Example 32 includes the subject matter of any of Examples 29-31, and wherein the data set further includes one or more time points associated with each 3D volumetric point and wherein applying the plurality of the segmentation modes further comprises applying the plurality of the segmentation modes across the one or more time points.

Example 33 includes the subject matter of any of Examples 29-32, and wherein the data set is representative of sonar data generated at time points at a rate of at least five pings per second.

Example 34 includes the subject matter of any of Examples 29-33, and wherein the receiving of the data set, the application of the segmentation modes, and the classification are performed in real-time.

Example 35 includes the subject matter of any of Examples 29-34, and wherein at least two of the plurality of segmentation modes are performed in parallel.

Example 36 includes the subject matter of any of Examples 29-35, and wherein classifying the one or more 3D volumetric objects further comprises matching each of the one or more 3D volumetric objects to one of a plurality of known objects.

Example 37 includes the subject matter of any of Examples 29-36, and wherein the operation further comprises correlating a 3D volumetric object of a first generated subset with a 3D volumetric object of a second generated subset.

Example 38 includes the subject matter of any of Examples 29-37, and wherein the operation further comprises performing one or more tasks using the classified one or more objects as input.

Example 39 includes the subject matter of any of Examples 29-38, and wherein one or more parameters are provided as input for at least one of the plurality of segmentation modes, the one or more parameters including at least one of a smallest number of points to satisfy a fitting model, a number of iterations to perform, an inlier identification threshold, a number of inlier points to assert a model fit, or a shape descriptor.

Example 40 includes the subject matter of any of Examples 29-39, and wherein processed output from a first segmentation mode to a second segmentation mode is determined based on the one or more tasks being performed.

Example 41 includes the subject matter of any of Examples 29-40, and wherein the one or more tasks comprises at least one of a seabed detection, terrain following, scene modeling, cable touch down point detection, autonomous underwater vehicle or remotely operated underwater vehicle tracking, structured object counting, path planning, localization, data alignment, threat detection, change detection, manual input processing, or diver tracking operation.

Example 42 includes the subject matter of any of Examples 29-41, and wherein the plurality of segmentation modes includes at least one of planar segmentation, line segmentation, curve segmentation, cylindrical segmentation, primitives segmentation, a priori model segmentation, or change detection.

Example 43 includes the subject matter of any of Examples 29-42, and wherein an inliers selection for the one or more 3D volumetric objects is based on a 3D geometrical position and/or an intensity of a 3D volumetric point.

The invention claimed is:

1. A method for processing a three-dimensional (3D) underwater scene, the method comprising:
receiving, by a computing device, a data set output by a sonar transducer assembly, wherein the data set represents an underwater environment, wherein the data set corresponds to sonar data generated by the sonar transducer assembly, and wherein the data set includes a plurality of 3D volumetric points representing at least one 3D volumetric data set at one or more time points;
receiving a specification of one or more tasks to perform on the received data set;
identifying, based on the specified one or more tasks to perform on the received data set and based on a known shape descriptor, two or more segmentation modes from a plurality of segmentation modes and a sequence for applying the identified segmentation modes to the received data set, wherein the two or more segmentation modes include a mode for extracting 3D geometric primitives from the received data set and wherein the known shape descriptor is indicative of at least one of a 3D mathematical shape or a physical 3D volumetric data set from an a priori model;
applying, by the computing device, the identified segmentation modes on the data set according to the identified sequence, wherein the application of each identified segmentation mode generates a segmented subset of the plurality of 3D volumetric points representing an interpretation of the underwater environment, each segmented subset including one or more 3D volumetric objects; and
classifying, by the computing device, the one or more 3D volumetric objects based on a combination of the plurality of segmented subsets.

2. The method of claim 1, wherein applying, by the computing device, the identified segmentation modes further comprises applying at least one of the identified segmentation modes recursively using the generated subset as input.

3. The method of claim 1, wherein the data set further includes one or more time points associated with each 3D volumetric point and wherein applying the identified segmentation modes further comprises applying the identified segmentation modes across the one or more time points.

4. The method of claim 3, wherein the data set is representative of sonar data generated at time points at a rate of at least five pings per second.

5. The method of claim 3, wherein at least two of the identified segmentation modes are performed in parallel.

6. The method of claim 1, wherein classifying, by the computing device, the one or more 3D volumetric objects further comprises matching each of the one or more 3D volumetric objects to one of a plurality of known objects.

7. The method of claim 1, further comprising correlating, by the computing device, a 3D volumetric object of a first generated subset with a 3D volumetric object of a second generated subset.

8. The method of claim 1, further comprising performing, by the computing device, the one or more tasks using the classified one or more objects as input.

9. The method of claim 8, further comprising receiving, by the computing device, a plurality of parameters as input for at least one of the identified segmentation modes, the one or more parameters including at least one of a smallest number of points to satisfy a fitting model, a number of iterations to perform, an inlier identification threshold, a number of inlier points to assert a model fit, or a shape descriptor.

10. The method of claim 8, wherein the identified segmentation modes include at least a first segmentation mode and a second segmentation mode, wherein output from the first segmentation mode is used as input to the second segmentation mode based on the one or more tasks being performed.

11. The method of claim 8, wherein the one or more tasks comprises at least one of a seabed detection, terrain following, scene modeling, cable touch down point detection, autonomous underwater vehicle or remotely operated underwater vehicle tracking, structured object counting, path planning, localization, data alignment, threat detection, change detection, manual input processing, or diver tracking operation.

12. The method of claim 1, wherein the plurality of segmentation modes includes at least one of planar segmentation, line segmentation, curve segmentation, cylindrical segmentation, primitives segmentation, a priori model segmentation, or change detection.

13. The method of claim 1, wherein an inliers selection for the one or more 3D volumetric objects is based on a 3D geometrical position and/or an intensity of a 3D volumetric point.

14. The method of claim 1, wherein each of the identified segmentation modes follows a random sample consensus (RANSAC) procedure on the data set.

15. A non-transitory computer-readable storage medium comprising a plurality of instructions, which, when executed on one or more processors of a computing device, causes the computing device to:
receive a data set output by a sonar transducer assembly, wherein the data set represents an underwater environment, wherein the data set corresponds to sonar data generated by the sonar transducer assembly, and wherein the data set includes a plurality of 3D volumetric points representing at least one 3D volumetric data set at one or more time points;
receive a specification of one or more tasks to perform on the received data set;

identify, based on the specified one or more to perform on the received data set and based on a known shape descriptor, two or more segmentation modes from a plurality of segmentation modes and a sequence for applying the identified segmentation modes to the received data set, wherein the two or more segmentation modes include a mode for extracting 3D geometric primitives from the received data set and wherein the known shape descriptor is indicative of at least one of a 3D mathematical shape or a physical 3D volumetric data set from an a priori model;

apply the identified segmentation modes on the data set according to the identified sequence, wherein the application of each identified segmentation mode generates a segmented subset of the plurality of 3D volumetric points representing a given interpretation of the underwater environment, each segmented subset including one or more 3D volumetric objects; and classify the one or more 3D volumetric objects of each processed subset based on a combination of the plurality of segmented subsets.

16. The non-transitory computer-readable storage medium of claim 15, wherein the data set further includes one or more time points associated with each 3D volumetric point and wherein to apply the identified segmentation modes further comprises to apply the identified segmentation modes across the one or more time points.

17. The non-transitory computer-readable storage medium of claim 15, wherein to classify the one or more 3D volumetric objects further comprises to match each of the one or more 3D volumetric objects to one of a plurality of known objects.

18. The non-transitory computer-readable storage medium of claim 15, wherein to apply the plurality of the segmentation modes further comprises to apply at least one of the plurality of the segmentation modes recursively using the generated subset as input.

19. A computing device comprising:
a sonar transducer assembly having a signal generator and a signal transducer;
one or more processors; and
a memory storing program code, which, when executed on the one or more processors, causes the computing device to:
receive a data set output by the sonar transducer assembly, wherein the data set represents an underwater environment, wherein the data set corresponds to sonar data generated by the sonar transducer assembly, and wherein the data set includes a plurality of 3D volumetric points representing at least one 3D volumetric data set at one or more time points, receive a specification of one or more tasks to perform on the received data set;

identify, based on the specified one or more tasks to perform on the received data set and based on a known shape descriptor, two or more segmentation modes from a plurality of segmentation modes and a sequence for applying the segmentation modes to the received data set, wherein the two or more segmentation modes include a mode for extracting 3D geometric primitives from the received data set and wherein the known shape descriptor is indicative of at least one of a 3D mathematical shape or a physical 3D volumetric data set from an a priori model, apply the identified segmentation modes on the data set according to the identified sequence, wherein the application of each identified segmentation mode generates a segmented subset of the plurality of 3D volumetric points representing a given interpretation of the underwater environment, each segmented subset including one or more 3D volumetric objects; and classify the one or more 3D volumetric objects of each processed subset based on a combination of the plurality of segmented subsets.

20. The computing device of claim 19, wherein the identification of the two or more segmentation modes and the sequence for applying the segmentation modes to the received data set is further based on the known shape descriptor.

* * * * *